United States Patent
Blalock

(10) Patent No.: US 8,013,798 B2
(45) Date of Patent: Sep. 6, 2011

(54) BELOW HORIZON ANTENNA AIMING

(75) Inventor: E. Mitchell Blalock, Atlanta, GA (US)

(73) Assignee: Viasat, Inc., Carlsbad, CA (US)

( * ) Notice: Subject to any disclaimer, the term of this patent is extended or adjusted under 35 U.S.C. 154(b) by 554 days.

(21) Appl. No.: 12/119,273

(22) Filed: May 12, 2008

(65) Prior Publication Data

US 2008/0278395 A1 Nov. 13, 2008

Related U.S. Application Data

(60) Provisional application No. 60/917,258, filed on May 10, 2007.

(51) Int. Cl.
*H01Q 3/00* (2006.01)
*H01Q 1/12* (2006.01)
(52) U.S. Cl. ......... 343/757; 343/766; 343/878; 343/915
(58) Field of Classification Search .................. None
See application file for complete search history.

(56) References Cited

U.S. PATENT DOCUMENTS

| | | | |
|---|---|---|---|
| 3,609,422 A | 9/1971 | Nordin | |
| 5,204,570 A | 4/1993 | Gerfast | |
| 5,402,049 A | 3/1995 | Lee et al. | |
| 5,476,018 A | 12/1995 | Nakanishi et al. | |
| 6,384,500 B1 | 5/2002 | Chassoulier et al. | |
| 6,819,550 B2 * | 11/2004 | Jobs et al. | 361/679.22 |
| 6,906,441 B2 * | 6/2005 | Mendenhall | 310/112 |
| 7,710,337 B2 * | 5/2010 | Blalock | 343/757 |
| 2007/0125330 A1 * | 6/2007 | Lee et al. | 123/90.16 |
| 2008/0042921 A1 | 2/2008 | Gierow et al. | |
| 2009/0231217 A1 | 9/2009 | Grange et al. | |
| 2009/0238668 A1 | 9/2009 | Grange et al. | |
| 2009/0315795 A1 * | 12/2009 | Blalock | 343/763 |

FOREIGN PATENT DOCUMENTS

| | | |
|---|---|---|
| EP | 1480318 A | 11/2004 |
| JP | 61012495 A | 1/1986 |

OTHER PUBLICATIONS

PCT International Search Report mailed Aug. 7, 2008, International Application No. PCT/US2008/063455; 12 pages.

* cited by examiner

*Primary Examiner* — Trinh Dinh
(74) *Attorney, Agent, or Firm* — Kilpatrick, Townsend & Stockton, LLP

(57) ABSTRACT

According to the invention, a system for aiming an antenna in a direction below-horizon is disclosed. The system may include a support member, a spherical structure, and at least one arm. The support member may be coupled with a surface. The spherical structure may be coupled with the support member and the spherical structure may be at least partially spherical in shape about a central point. The at least one arm may be rotatably coupled with the spherical structure. The at least one arm may be coupled with the antenna. The at least one arm may at least partially defines a void. And the support member may be at least partially disposed within the void when the antenna is aimed in the direction below-horizon.

16 Claims, 18 Drawing Sheets

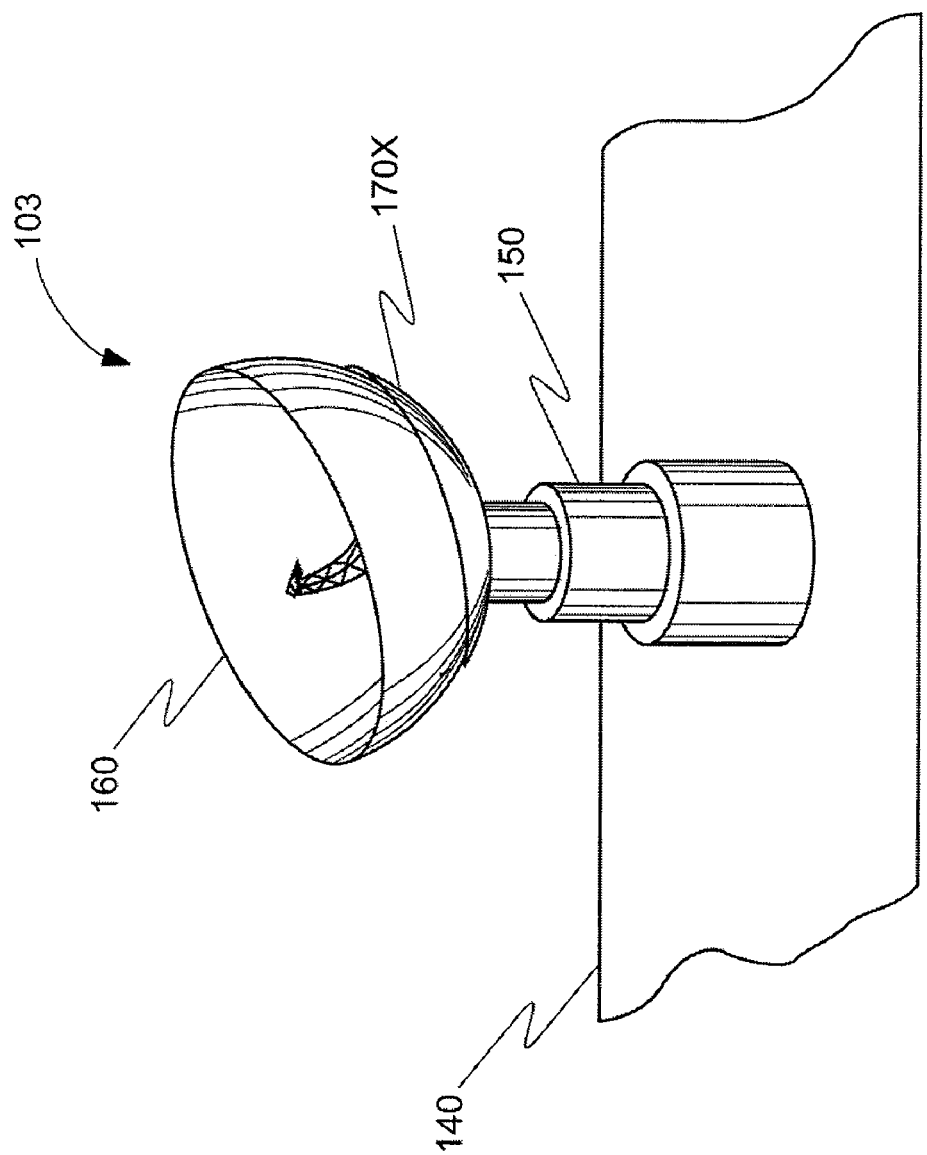

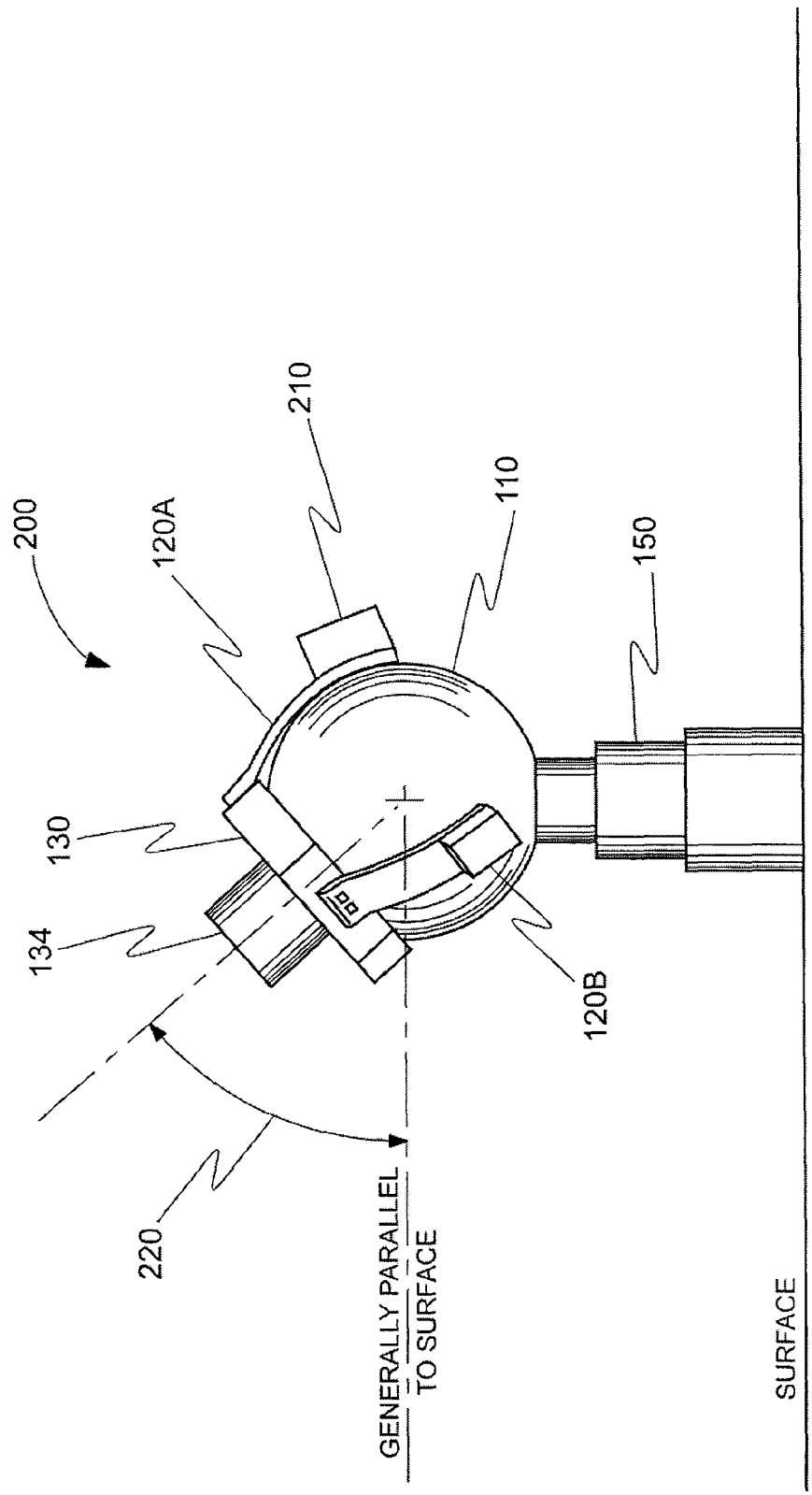

BELOW HORIZON ANTENNA AIMING

CROSS-REFERENCE TO RELATED APPLICATIONS

This application claims priority to Provisional U.S. patent application Ser. No. 60/917,258 filed May 10, 2007, entitled "SPHERICAL MOTOR POSITIONING," the entire disclosure of which is hereby incorporated by reference, for all purposes, as if fully set forth herein.

BACKGROUND OF THE INVENTION

This invention relates generally to reorientation of objects via electro-mechanical means. More specifically the invention relates to rotating parabolic antennas.

Existing electromechanical systems employed to reorient objects usually involves providing rotational motion of objects about certain axes. Each desired axis of rotation capability typically requires an independent electromechanical system. For example, a single axis of rotation is easily achieved using a singular electromechanical system which may include a chassis, motors, gearboxes, shafts, and bearings. Two axes of rotation necessitate an additional electromechanical system. Finally, three axes of rotation require yet another additional electromechanical system.

Addition of electromechanical systems to achieve two and three axes rotation also requires coordination of all electromechanical systems to ensure there is minimized physical interference between these systems. Even with diligent design consideration, it is often impossible to provide systems in which significant portions of the turning radius of various axes are unavailable due to physical interference.

For example, a single axis rotational system may allow for 120 degrees of movement in that axis, but adding a second axis of rotation having 60 degrees of movement cause the movement in the first axis to be limited to 90 degrees because of physical interference between the two systems. Continuing the example, if a third axis of rotation was added, the first axis may then be limited to 60 degrees, the second axis to 45 degrees, with the third axis only providing a small amount of rotational freedom (i.e. 30 degrees).

This limitation on the rotational degree of freedom in each axis can lead to some significant limitations in real world applications. By way of example, below-horizon aiming of parabolic antennas, which may require severe angular freedom of motion, may be impossible if multiple axes of rotation are also desired.

Furthermore, the ability to rotate a subject object about an axis of its own, or provide for other functions of such a subject object (i.e. power and data transfer), may also be impeded or otherwise complicated by the electromechanical systems necessary for rotation in all axes. For example, providing power and/or data transfer to these subject objects may be interfered with either because of either physical interference by the rotational systems, or the extreme nature of desired rotations when actually achievable.

BRIEF DESCRIPTION OF THE INVENTION

In one embodiment, a system for aiming an antenna in a direction below-horizon is provided. The system may include a support member, a spherical structure, and at least one arm. The support member may be coupled with a surface. The spherical structure may be coupled with the support member. The spherical structure may be at least partially spherical in shape about a central point. The at least one arm may be rotatably coupled with the spherical structure. The at least one arm may be coupled with the antenna. The at least one arm may at least partially defines a void. The support member may be at least partially disposed within the void when the antenna is aimed in the direction below-horizon.

In another embodiment, a method for aiming an antenna in a direction below-horizon is provided. The method may include providing a support member, where the support member is coupled with a surface. The method may also include providing a spherical structure. The spherical structure may be coupled with a surface. The spherical structure may be at least partially spherical in shape about a central point. The method may further include providing at least one arm. The at least one arm may be rotatably coupled with the spherical structure. The at least one arm may be coupled with the parabolic antenna. The at least one arm at least partially defines a void. The method may moreover include rotating the at least one arm such that the support member may be at least partially disposed within the void when the antenna is aimed in the direction below-horizon.

In another embodiment, a system for aiming a subject object in a direction below-horizon is provided. The system may include a support member, a spherical structure, and at least one arm. The support member may be coupled with a surface. The spherical structure may be coupled with the support member. The spherical structure may be at least partially spherical in shape about a central point. The at least one arm may be rotatably coupled with the spherical structure. The at least one arm may be coupled with the antenna. The at least one arm may at least partially defines a void. The support member may be at least partially disposed within the void when the subject object is aimed in the direction below-horizon.

BRIEF DESCRIPTION OF THE DRAWINGS

The present invention is described in conjunction with the appended figures:

FIG. 1C is an axonometric view of an embodiment of the invention, similar to that in FIG. 1B, except having a spherically shaped continuous arm fixed with the support member, rather than multiple discrete arms;

FIG. 2 is a side view of an embodiment of the invention having a spherical motor with a counterweight;

Figure 1:
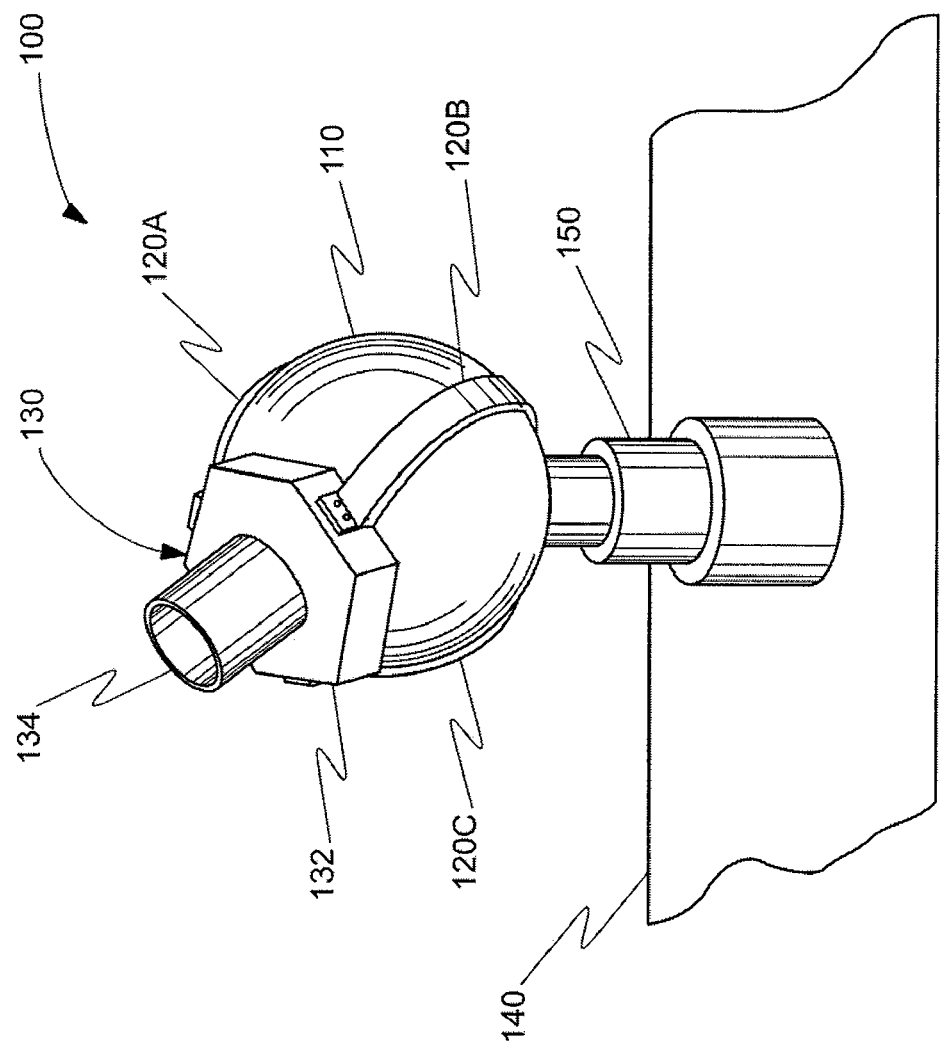
FIG. 1 is an axonometric view of an embodiment of the invention providing a spherical motor.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Turning to FIG. 1, one embodiment of a spherical motor 100 of the invention is shown. Spherical motor 100 may include an at least partially sphere shaped structure 110 (hereinafter the "structure 110") and at least one at least partially sphere shaped arm 120. A subject object may be coupled with arms 120 at coupling apparatus 130 (which is itself coupled with arms 120). In some embodiments, arms 120 may incorporate the functionality and/or structure of coupling apparatus 130.

Spherical motor 100 may be controlled, possibly via a control system, to revolve arms 120 relative to structure 110 and substantially about a central point located at least near the center of structure 110. The subject object, being coupled with arms 120 via coupling apparatus 130, may also then revolve about that central point. In this manner, if the subject object is desired to be pointed at a point in space, the azimuth direction and the elevation angle of the object may be changed. Structure 110 may also be coupled with a surface 140 via a support member 150. Surface 140 may possibly be the Earth, a structure attached to the Earth or a portion of a movable object such as a manned or unmanned vehicle, including orbital satellites.

Structure 110 may include a plurality of individually controllable electromagnets, possibly in proximity to the surface of structure 110. In some embodiments, portions of the surface not having electromagnets may instead include a dielectric material. Individually controllable electromagnets may possibly be controlled via the control system. As individual electromagnets are activated and deactivated, the electromagnetic forces generated by the electromagnets may cause permanent magnets and/or electromagnets in arms 120 to react. This may cause arms 120 to revolve about structure 100. Any subject object coupled with coupling apparatus 130 may therefore revolve relative to structure 110, and thus about the central point.

In some embodiments, arms 120 may be in proximity to the curved surface of structure 110, and curved to match that curvature. In other embodiments, arms 120 may be curved around only one axis, rather than having a spherical curvature. While any number of arms are possible, in an exemplary embodiment, spherical motor 100 may have three arms 120. While in one embodiment, arms 120 may have permanent magnets, in other embodiments, arms 120 may have either electromagnets, or a combination of permanent magnets and electromagnets. In other embodiments, structure 110 may include permanent magnets, and electromagnets in arms 120 may be activated to cause revolution of arms 120. In yet other embodiments, combination electromagnets/permanent magnets may be used which utilized a paired electromagnet for each permanent magnet to selectively negate the permanent magnet's magnetic field.

Figure 1A:
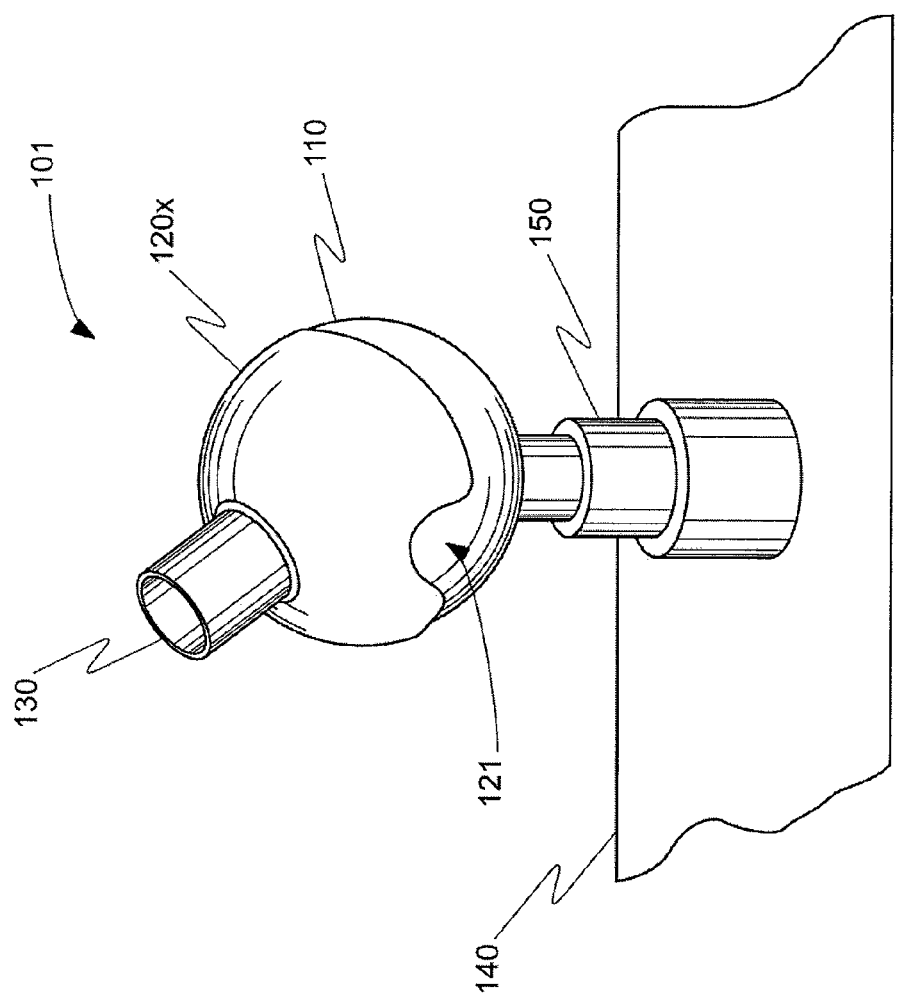
FIG. 1A is an axonometric view of an embodiment of the invention, similar to that in FIG. 1, except having a spherically shaped continuous arm, rather than multiple discrete arms.

FIG. 1A shows another embodiment of the invention in which the spherical motor 101 includes only one spherically shaped continuous arm 120X. In this embodiment, rather than having multiple discrete arms 120 as in FIG. 1, spherical motor 101 instead uses one continuous arm 120X. Continuous arm 120X is spherically shaped to match structure 110, and comprises permanent magnets and/or electromagnets in proximity to the inner surface of continuous arm 120X which react with permanent magnets and/or electromagnets in structure 110 to cause the arms to revolve about structure 110.

Continuous arm 120X may cover any portion of structure 110. The smaller the coverage of structure 110, the greater freedom of movement of continuous arm 120X, and consequently coupling apparatus 130, and any subject object coupled thereto will have. In some embodiments, smaller continuous arms 120X may provide below-horizon aiming for a subject object coupled with coupling apparatus 130 (depending also on the size of support member 150). In some embodiments, large surface area coverage may allow for greater torques to be generated because more magnets may be brought to bear on moving continuous arm 120X.

When the circumference of the inside curve of continuous arm 120X is greater than half of the circumference of the curve of structure 110, it will be less likely, if not impossible, for continuous arm 120X to unintentionally uncouple from structure 110. In embodiments where the circumference of the inside curve of continuous arm 120X is smaller than half of the circumference of the curve of structure 110, friction, counterweights, and/or selective activation of electromagnets may at least assist in preventing continuous arm 120X from decoupling from structure 110.

In some embodiments, continuous arm 120X may have at least one notch 121 defined by the remainder of the continuous arm 120X. Notch 121 may allow continuous arm 120X to rotate to lower elevation angles and achieve below-horizon aiming. Multiple notches 121 in continuous arm 120X may allow for quicker below-horizon aiming in different azimuth directions because a different notch 121 may be used instead of having to rotate the singular notch 121 to the new azimuth direction.

A subject object may include any object, and in exemplary embodiments may include antennas, including parabolic antennas; weapons systems, including mounted firearms, lasers and/or sonic systems; sports equipment such as ball throwers; lighting devices; optical systems or components such as lenses and mirrors; and/or robotic arms. In some embodiments, the subject object may be coupled with arms 120 without intermediary coupling apparatus 130. In these or other embodiments, multiple subject objects may be coupled with either arms 120 or coupling apparatus 130.

Figure 1B:
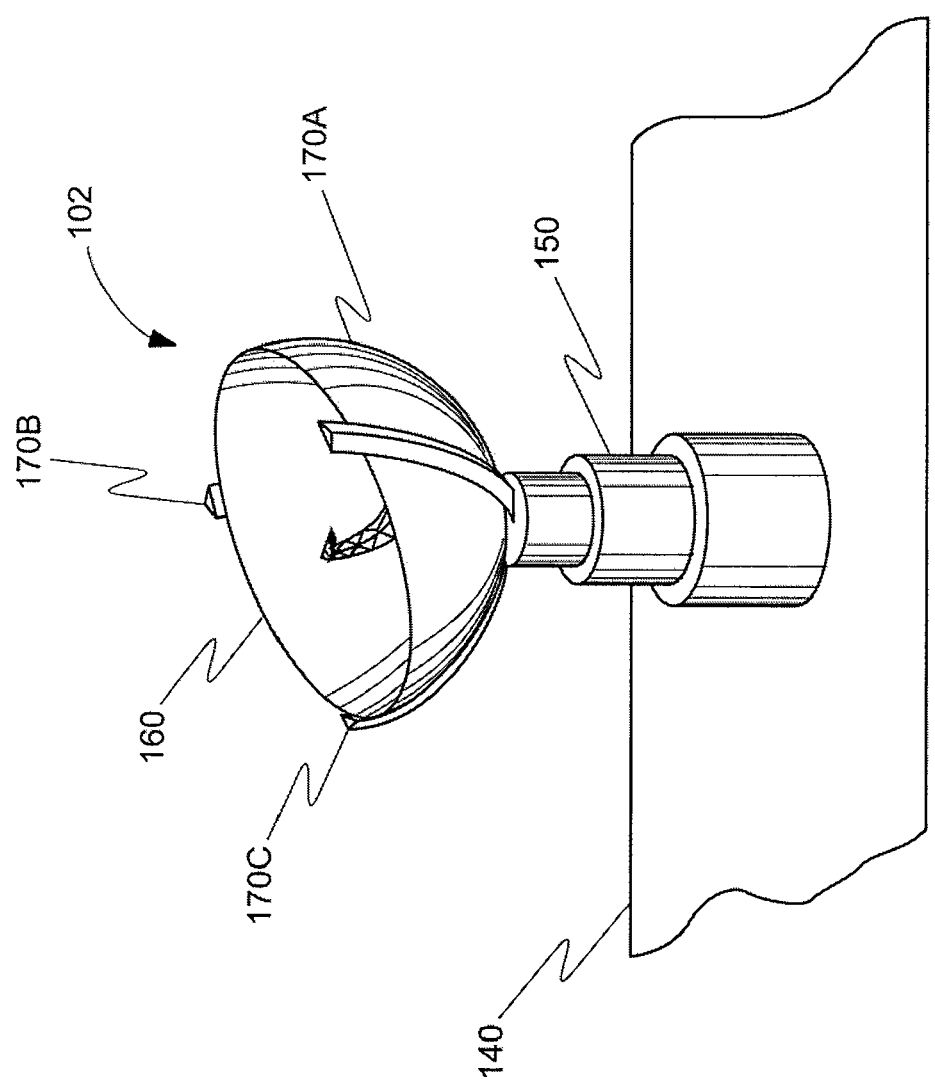
FIG. 1B is an axonometric view of an embodiment of the invention providing a spherical motor having arms fixed with a support member for rotating a partially spherically curved object.
Figure 3:
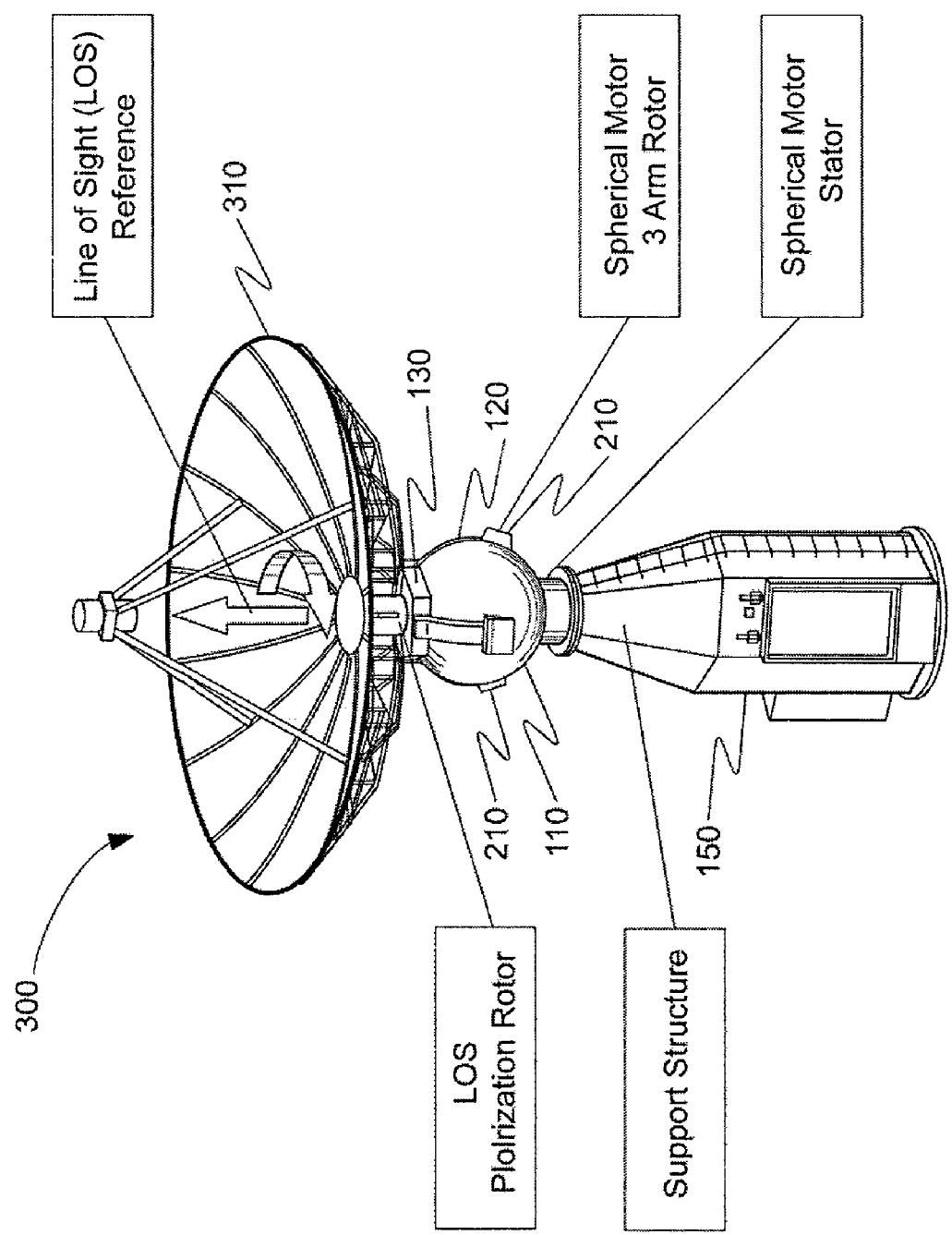
FIG. 3 is an isometric view of an embodiment of the invention used to direct a parabolic antenna subject object.
Figure 4:
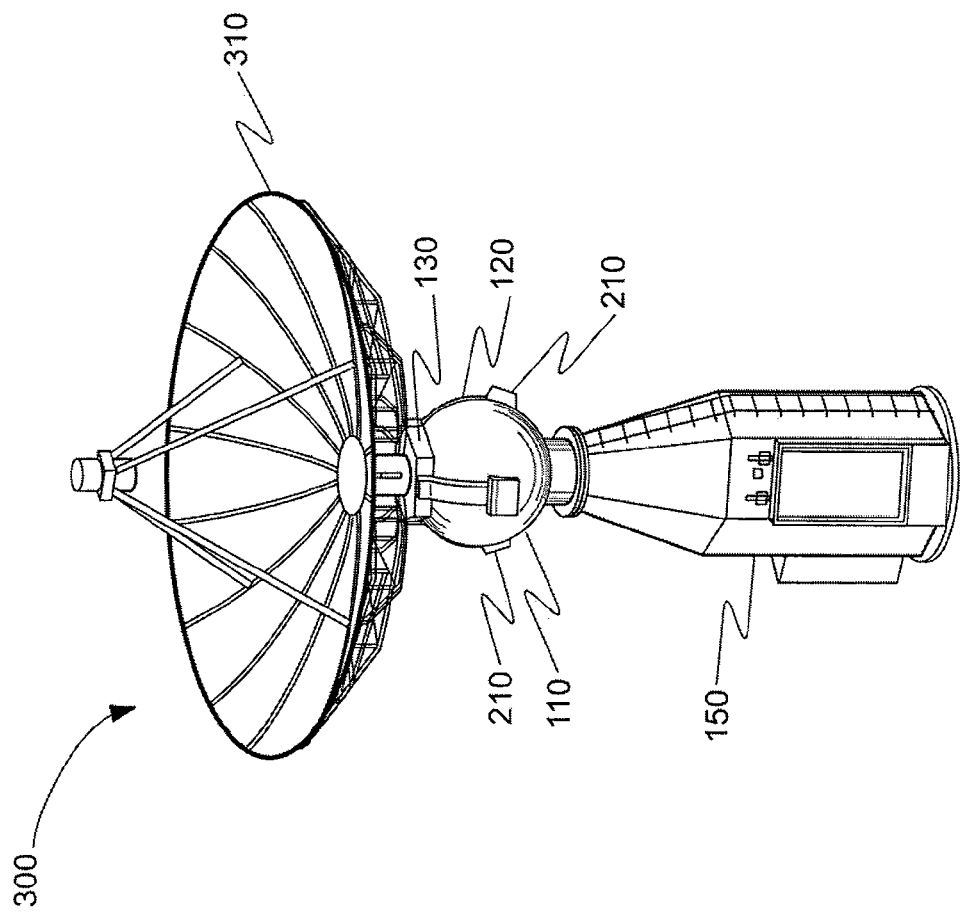
FIG. 4 is another isometric view of an embodiment of the invention with a parabolic antenna subject object at zenith position.
Figure 5:
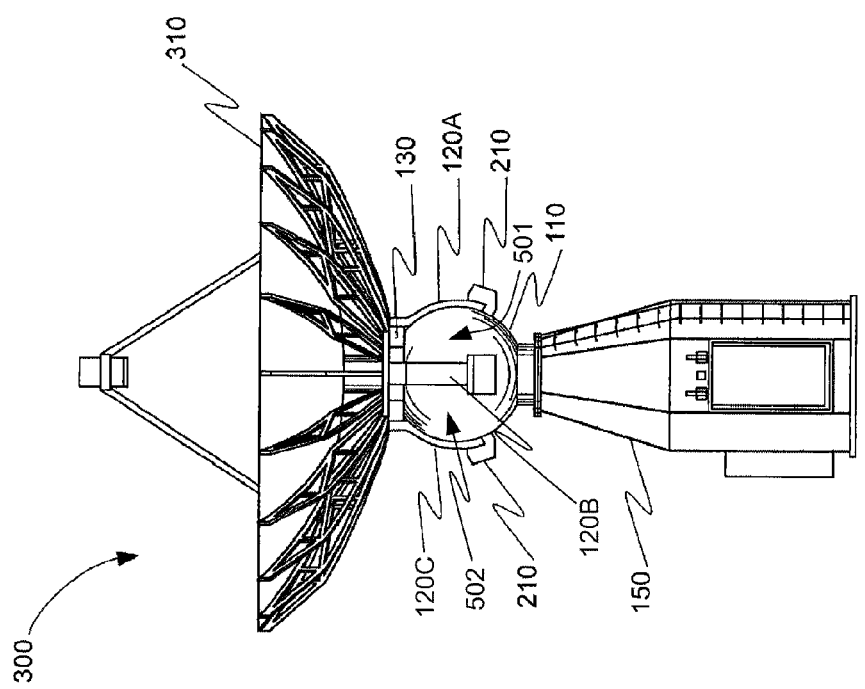
FIG. 5 is a side view of the embodiment shown in FIG. 4.

FIG. 1B shows another possible spherical motor 102 embodiment of the invention. In this embodiment, the subject object 160 is a parabolic dish, though in other embodiments it may be another at least partially round object (or an object coupled with another at least partially round object). Subject object 160 may be supported by support member 150 and/or one or more arms 170. The curvature of subject object 160 may be configured to match the curvature formed by arms 170. In this embodiment, three arms 170 are shown, but fewer or more arms 170 could be present in other embodiments.

Subject object 160 may have permanent magnets and/or electromagnets which react to permanent magnets and/or electromagnets in arms 170 to cause subject object 160 to revolve. In this, or other similar embodiments, arms 170 may be configured to direct subject object 160 primarily toward a certain general direction. In these embodiments, one or more of the arms 170 may differ in length and/or other structural characteristics from one or more of the other arms 170. In other embodiments, each arm 170 may be substantially similar to each of the other arms 170, and/or may be positioned symmetrically about support member 150 and/or subject object 160. In some embodiments, various portions of subject object 160 may include counterweights to at least assist in maintaining subject object 160 in a substantially stationary position.

FIG. 1C shows another possible spherical motor 103 embodiment of the invention. In this embodiment, the subject object 160 is a parabolic dish, though in other embodiments it may be another at least partially round object (or an object coupled with another at least partially round object). Subject object 160 may be supported by support member 150 and/or one or more concave continuous arms 170X. In this embodiment, one continuous arm 170X is shown. The curvature of subject object 160 may be configured to match the curvature formed by arm 170X.

Subject object 160 may have permanent magnets and/or electromagnets which react to permanent magnets and/or electromagnets in arm 170X to cause subject object 160 to revolve. In this, or other similar embodiments, arm 170X may be configured to direct subject object 160 primarily toward a certain general direction. In these embodiments, arm 170X may be "tilted" in a particular direction, perhaps the certain general direction. In some embodiments, various portions of subject object 160 may include counterweights to at least assist in maintaining subject object 160 in a substantially stationary position.

Friction may be both advantageous and detrimental in spherical motor 100 between arms 120, coupling apparatus 130 and structure 110 (hereinafter the "interface"). Friction may be advantageous because it provides a means of maintaining arms 120 and coupling apparatus 130 in a location on structure 110 when no movement is desired. However, friction must also be overcome to allow for movement of arms 120 and coupling apparatus 130 around structure 110. Increased friction requires more torque to overcome, possibly increasing the size, number and/or power of the magnets in arms 120 and structure 110.

To achieve a desirable amount of friction in the interface, low-friction materials may be used to form the outer layer, or skin, of structure 110, arms 120 and coupling apparatus 130. Both viscous and non-viscous friction-reducing fluids may also be applied to lubricate the interface. Fluid distribution systems on arms 120, coupling apparatus 130, structure 110 and/or independently may be provided to dispense fluid at the interface before and/or during periods of movement.

In some embodiments, a fluid system (for example, a pneumatic system) may provide a thin layer of fluid at the interface to reduce friction. In another possible embodiment, magnetic bearings may use the magnets in both arms 120 and structure 110 to provide magnetic levitation of arms 120 and coupling apparatus 130 away from structure 110. Any of the aforementioned or other friction reducing systems may create a small gap and/or at least a reduction in pressure between at least some portion of arms 120 and structure 110 to reduce friction.

Fluid or magnetic bearing systems may be advantageous because they may be selectively activated and deactivated, providing contact at the interface when deactivated and allowing friction to hold arms 120 and coupling apparatus 130 in place when no movement is desired. In such embodiments, the skins of arms 120, coupling apparatus 130 and structure 110 may be made from high friction materials, since friction can be reduced or removed when necessary by the selectively activated friction reducing systems discussed herein or other selectively activated friction reducing systems.

In some embodiments, one or more of arms 120 may be counterweighted such that a greater range of motion may be realized by spherical motor 100. As shown in FIG. 2, a counterweight 210 may be added to arm 120C in another spherical motor 200 of the invention. Embodiments where fewer than all arms 120 are counterweighted may be advantageous when the direction of coupling apparatus 130 (where the direction includes an azimuth direction and an elevation angle 220) is regularly pointed in directions opposite counterweight 210. This may particularly occur in antenna applications where antennas in the northern hemisphere of the Earth may be generally be pointed southward and vice-versa.

Counterweights 210 may at least assist in forcing the center of gravity for the combined arms 120 and coupling apparatus 130 to exist higher on top of structure 110, thereby reducing the amount of friction necessary to keep arms 120 and coupling apparatus 130 from sliding undesirably from a given position due to their weight and the weight of any subject object coupled with coupling apparatus 130. In other embodiments, counterweights 210 may increase overall friction between arms 120, coupling apparatus 130 and structure 110, thereby increasing friction and stabilizing the position of the coupled subject object during periods of non-movement. The weight of a counterweight 210 may be substantial enough to counterbalance the opposing weight of the subject object and/or other arms or portions of the same arm, and thereby provide stability before, during, and/or after movement of the subject object.

Depending on the physical size and/or arrangement of structure 110, coupling apparatus 130, and support member 150, as well as the size, number and/or arrangement of arms 120, the range of motion of coupling apparatus 130 in relation to structure 110 may be varied. As shown in FIG. 1, as coupling apparatus 130 rotates in a downward direction, arms 120B, 120C may revolve on either side of support member 150. This may allow revolution of coupling apparatus 130 until the point at which physical contact is made with support member 150. In this manner, coupling apparatus 130 may be aimed below-horizon.

Figure 6:
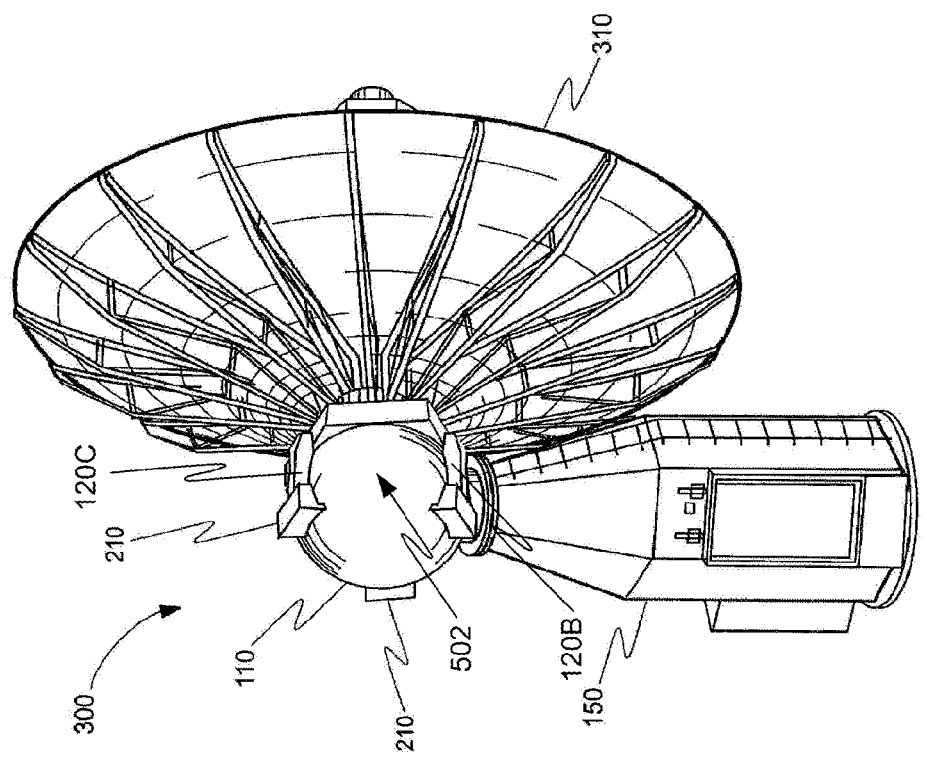
FIG. 6 is an isometric view of an embodiment of the invention with a parabolic antenna subject object at a below horizon position.
Figure 7:
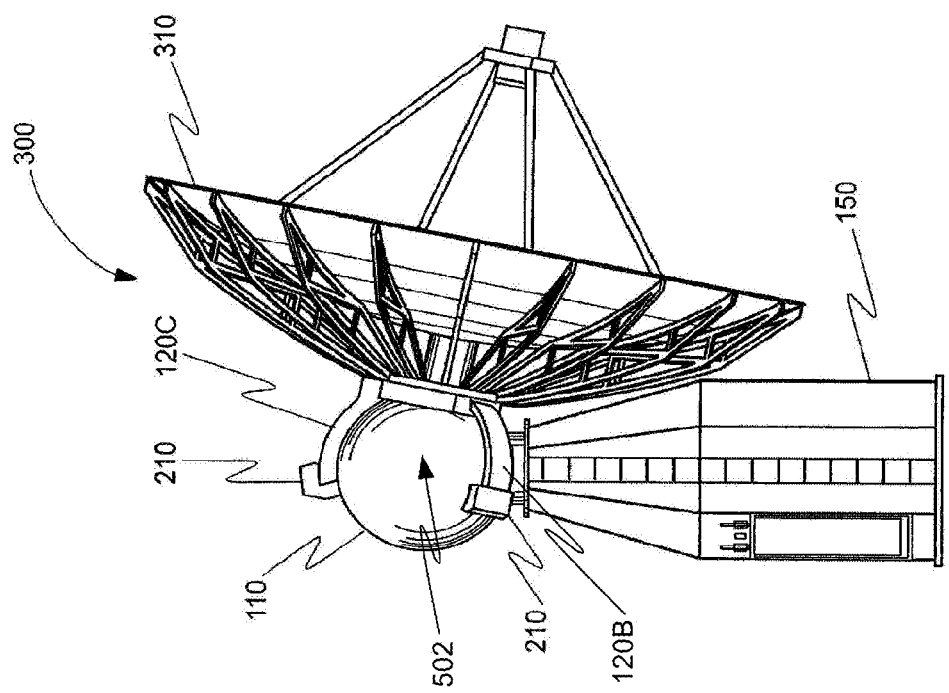
FIG. 7 is a side view of the embodiment shown in FIG. 6.

FIGS. 3-7 show another spherical motor 300 embodiment of the invention where the subject object is a parabolic antenna 310. FIG. 6 and FIG. 7 show how below-horizon aiming may be achieved in some embodiments of the invention by revolving a plurality of arms 120 about structure 110 so that support member 150 is between two arms 120A and 120B at the below-horizon position, within void 501, illustrated in FIG. 5 and formed between arms 120A and 120B. Another void 502 is formed between arms 120B and 120C.

In some embodiments, the size and/or shape of coupling apparatus 130 may be reduced to allow for greater below-horizon aiming. For example, a shaped cutout on coupling apparatus 130 may allow support member 150 to enter the cutout when, thereby increasing the below-horizon angle which may be achieved. In these or other embodiments, the size of the area where support member 150 is coupled with structure 110 may be reduced to allow for greater below-horizon aiming.

During operation, it may be desired to revolve coupling apparatus 130 downward when an arm 120 is extending from coupling apparatus 130 in direction of support member 150. In these situations, before coupling apparatus 130 is revolved downward, coupling apparatus 130 and arms 120 may be rotated such that support member 150 will be between arms 120 once coupling apparatus 130 is revolved downward. In some embodiments, automated control systems may ensure that above described initial condition never exists by finishing revolution of arms 120 in manners which will allow for downward rotations without further preparatory polarity rotations of arms 120.

In some embodiments, support member 150 may be itself capable of at least partly reorienting structure 110, thereby reducing the need to activate and deactivate electromagnets in arms 120 and/or structure 110. In some embodiments, the coupling between support member 150 and structure 110 may be selectively rotatable and may allow structure 110 to rotate relative to support member 150. In other embodiments, support member 150 may be configured to rotate relative to surface 140, with structure 110 fixedly coupled with support member 150. In either embodiment, rotation, and therefore change in azimuth direction of the subject object may be achieved alternatively or in addition to activation of the electromagnets in structure 110 and/or arms 120.

In some embodiments, support member 150 may also have a telescoping mechanism to raise the elevation of structure 110. This may increase the distance to which below-horizon targets may be pointed at by a subject object coupled with coupling apparatus 130.

In some embodiments, structure 100 may not be fixedly coupled with support member 150, and instead may reside in a partially spherical shaped depression at the top of support member 150. Electromagnets at or near the surface of the depression, and possible in structure 110, may then be selectively activated to rotate structure 110.

In some embodiments, a portion of coupling apparatus 130 may be rotated relative to the remainder of coupling apparatus 130. As shown in FIG. 1, coupling apparatus 130 may include base 132 and rotating coupling 134. Base 132 may be rotatably coupled with rotating coupling 134. In some embodiments, coupling apparatus may include an independent system such as a motor and gear box which may rotate rotating coupling 134 relative to base 132.

In other embodiments, the bottom of rotating coupling 134 may include permanent magnets and/or electromagnets in proximity to structure 110. In these embodiments, electromagnets in rotating coupling 134 and/or structure 110 may be selectively activated to cause rotating coupling 134 to rotate relative to base 132. In such a manner, the subject object may be rotated without changing the direction it is pointed. Such a rotation may also be accomplished by rotating arms 120 around structure 110 in the manner described above, but rotating the rotating coupling 134 may consume less energy.

In some embodiments, coupling apparatus 130 may also have a telescoping extension to adjust the distance between the subject object and structure 110 or arms 120. In some embodiments, this may reduce electromagnetic interference between functions of the subject object and other components of spherical motor 100.

In some embodiments, power may be transferred between support member 150 and structure 110 and/or between structure 110 and coupling apparatus 130 using electromagnetic induction. In these embodiments, power for electromagnets and/or other functions of support member 150 could be hard-wired from a source available at or near surface 140. Power may then be transferred to structure 110 from support member 150 through electromagnetic induction. Using electromagnetic induction, current would be supplied to an electric coil in support member 150, causing an electromagnetic field to be generated. A corresponding coil in structure 110 would react to the electromagnetic field and generate a current which could be used by electromagnets or other functions in structure 110. In other embodiments, power may be hard-wired between support member 150 and structure 110.

Similarly, electromagnetic induction may be used to transfer power between structure 110 and arms 120 and/or coupling apparatus 130. Power at arms 120 and/or coupling apparatus 130 may be used to power electromagnets and/or other functions of support member 150. Furthermore, once power is delivered to coupling apparatus 130, it may be transferred to the subject object for any required uses. In other embodiments, power may be hard-wired between structure 110 and arms 120 and/or coupling apparatus 130.

In some embodiments, power may be delivered to any component of spherical motor 100, or a subject object coupled therewith by hard-wired rigid and/or flexible conduit and/or conductor. Merely by way of example, a flexible conduit and conductor could be used to deliver hard-wired power to arms 120 and a subject object, while rigid conduit and conductor could be used to deliver hard-wired power to structure 110.

As with supplying power, control signals for various portions of the spherical motor, or data signals received and/or transmitted by the subject object may be communicated to local/proximate or remote systems either via hard-wired or wireless connections. Local/proximate systems include those systems which might normally be in communication with the subject object via hardwired connection. In some embodiments, wireless communication methods such as radio, microwave and/or infrared signaling may be employed to: activate electromagnets, activate friction reducing systems, communicate control instructions and/or data with the subject object, and/or communicate with other systems associated with spherical motor 100.

In some embodiments, control signals may be modulated via electromagnetic induction within the power transfer between components using electromagnetic induction to receive power. In some embodiments, modulation may also occur in hard-wired power connections. Communications subsystems on either side of the aforementioned power transfers may be provided to encode and/or decode these communications. Data signals, possibly to and from the subject object (i.e. a parabolic antenna), may also be modulated, possibly via electromagnetic induction and/or hard-wired connection.

Some embodiments may also include one or more control systems to control operation of the spherical motor. These control systems and/or at least one data store in communication with the control system (collectively hereinafter the "control systems") may include algorithms to control activation of electromagnets in either structure 110 or arms 120. Furthermore, in some embodiments, data acquisition devices such as sensors may communicate with the control system to provide feedback on the current status of the spherical motor.

Merely by way of example, data acquisition systems may provide information relating to, or usable to determine, the location of arms 120, coupling apparatus 130 and/or subject object relative to structure 110 or other reference point; the velocity (wherein the velocity includes both the direction and speed) of arms 120, coupling apparatus 130 and/or subject object relative to structure 110 or other reference point; the elevation angle of a subject object; the azimuth direction of a subject object; and/or the polarity of a subject object.

In some embodiments, the control systems may include a numerical representation of the layout of the permanent magnets and/or electromagnets in either one or both of structure 110 and arms 120. The control system may also include data on the rotational effects of activating individual electromagnets on structure 110 which are located relatively to other electromagnets and/or permanent magnets on arms 120, and/or vice versa. Such effects may include, for example, in what direction and at what speed arms 120 will move relative to structure 110.

Using data from data acquisition systems on the location of arms 120 relative to structure 110, the control systems may provide information relating to, or usable to determine, the relative locations of permanent magnets and/or electromagnets on both structure 110 and arms 120. The control system, knowing the relative location of all magnets, and the effects of activating or deactivating each magnet, may activate and deactivate electromagnets to achieve a desired position and/or velocity of arms 120 relative to structure 110.

In another embodiment, at least some of the electromagnets on structure 110 and/or arms 120 may have at least one data acquisition device to determine how that particular electromagnet should be activated to achieve a desired result. In these embodiments, each electromagnet may work independently to achieve the overall desired movement of arms 120 around structure 110. Also, in these or other embodiments, a configuration routine may be run by the control systems which tests, determines, and records the effect of each electromagnet present in the system on the position of arms 120 relative to structure 110 to create a set of data from which sequences of actions necessary for future desired movements of arms 120 may be determined.

In some embodiments, different voltages and/or currents can be applied to any given electromagnet to adjust the speed and/or torque at which a movement occurs. Higher speeds may be advantageous in applications where the subject object coupled with arms 120 is tracking an object which is moving relatively quickly. Higher torques may be advantageous to maintain certain speeds or movement in applications where the subject object has a relatively high mass.

Figure 8:
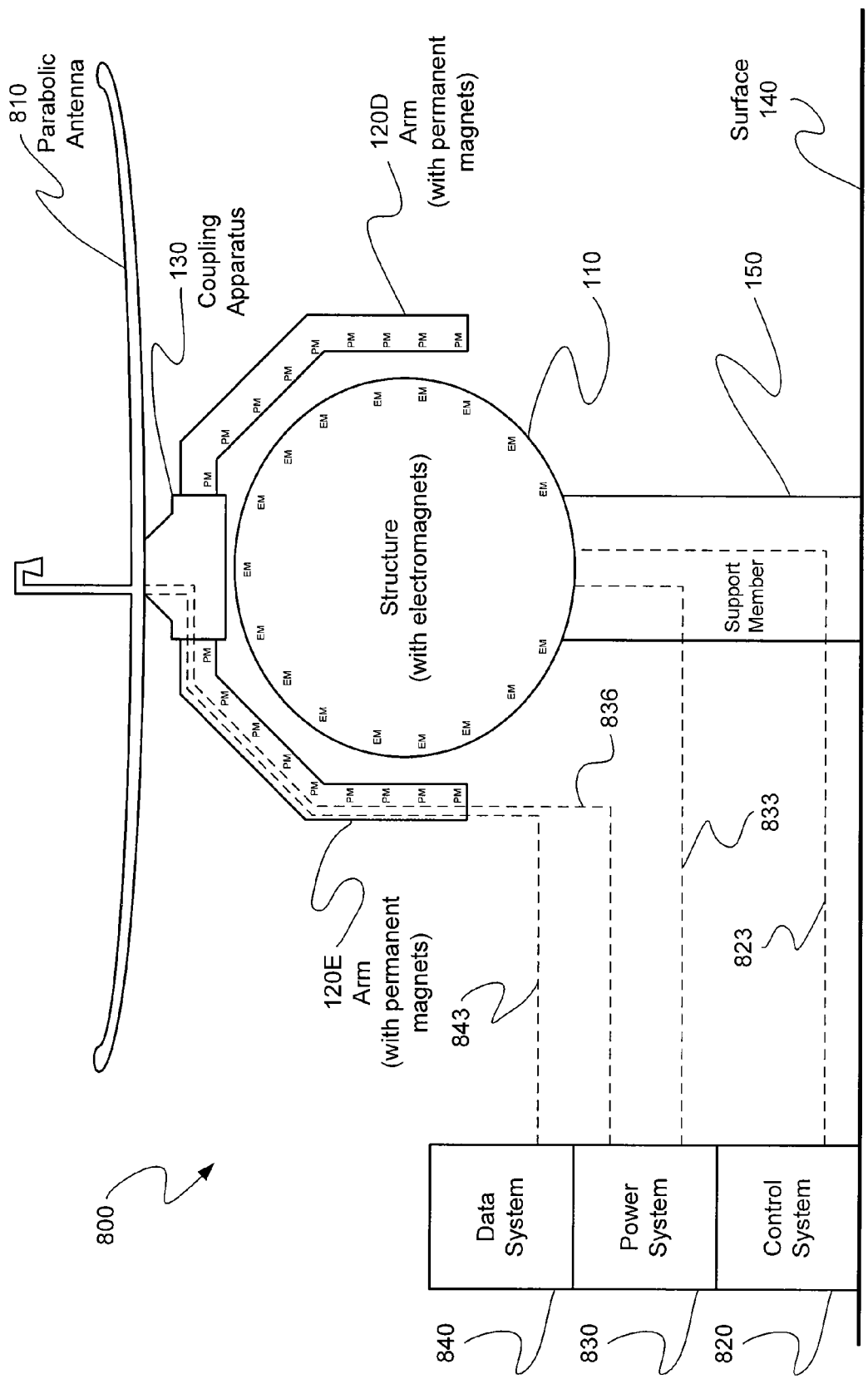
FIG. 8 is an electromechanical block diagram of an exemplary system for revolving a parabolic antenna using a spherical motor.

Turning now to FIG. 8, an electromechanical block diagram of a first exemplary system 800 for revolving a parabolic antenna 810 using a spherical motor is shown. In this embodiment, a control system 820 provides control signals via control connection 823 to activate or deactivate electromagnets (represented diagrammatically via multiple "EM" notations) in structure 110. The permanent magnets (represented diagrammatically via multiple "PM" notations) in arms 120 will react to the electromagnetic field created by the electromagnets in structure 110, causing arms 120 to revolve around structure 110. Power for electromagnets in structure 110 is provided by power system 830 via power connection 833.

Because parabolic antenna 810 is coupled with arms 120 via coupling apparatus 130, parabolic antenna will revolve around structure 110.

Power for parabolic antenna 810 is provided from power system 830 via power connection 836. Flexible conduit and conductor may be used so that power connection 836 may be maintained whatever the position of parabolic antenna 810. Data system 840 may receive and transmit data signals with parabolic antenna 810 via data connection 843. Like power connection 836, flexible conduit and conductor may be used so that data connection 843 may be maintained whatever the position of parabolic antenna 810. In this or any other embodiment, optical cabling may also be used to transmit data or control signals via optical means.

Figure 9:
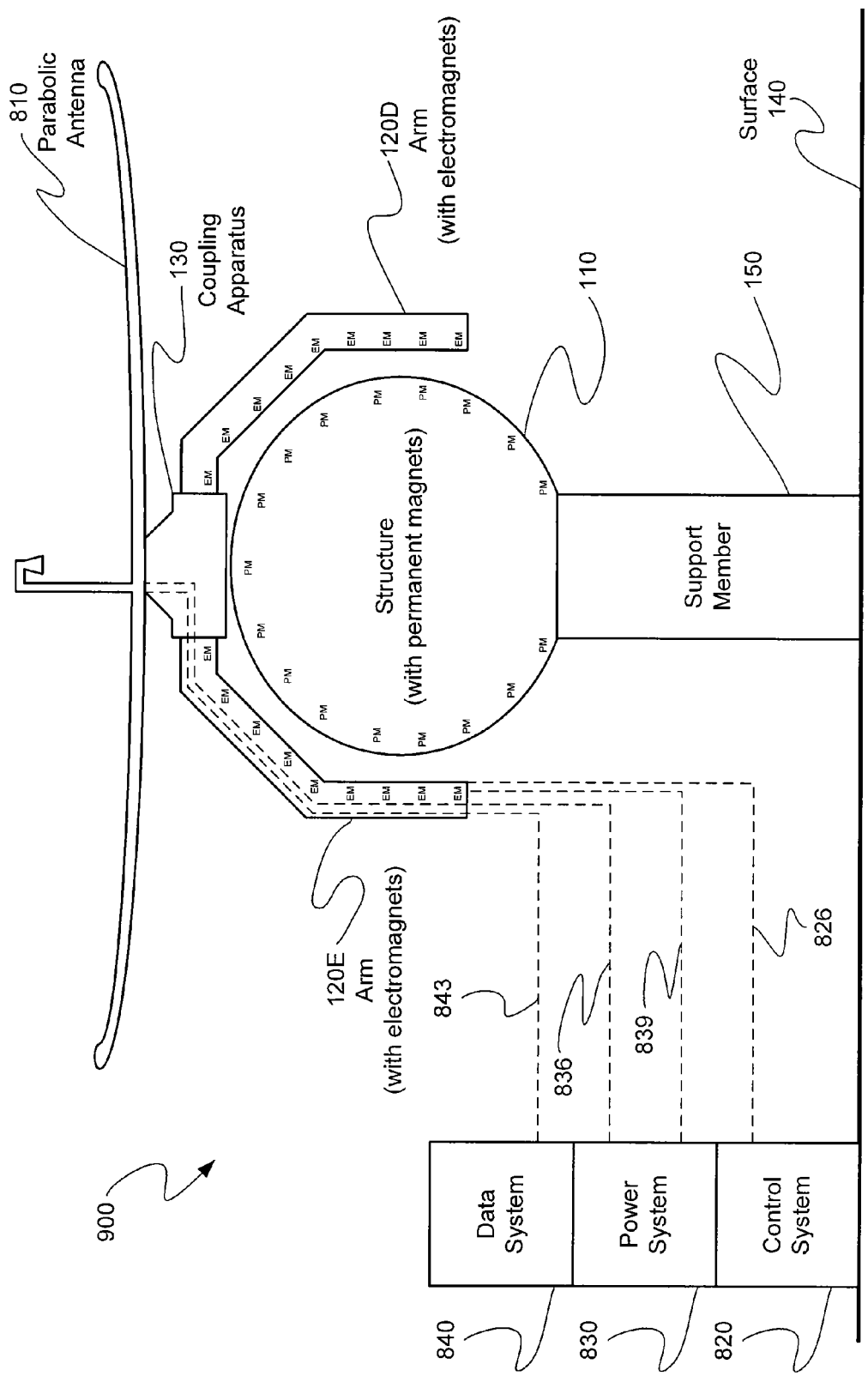
FIG. 9 is an electromechanical block diagram of an exemplary system for revolving a parabolic antenna using a spherical motor, similar to that in FIG. 8, except using permanent magnets in the structure, and electromagnets in the arms.

In FIG. 9, an electromechanical block diagram of a second exemplary system 900 for revolving a parabolic antenna 810 using a spherical motor is shown. In this embodiment, a control system 820 provides control signals via control connection 826 to activate or deactivate electromagnets in arms 120. The electromagnets in arms 120 will react to the magnetic field created by the permanent magnets in structure 110, causing arms 120 to revolve around structure 110. Power for electromagnets in arms 120 is provided by power system 830 via power connection 839. Because parabolic antenna 810 is coupled with arms 120 via coupling apparatus 130, parabolic antenna will revolve around structure 110.

Power for parabolic antenna 810 is provided from power system 830 via power connection 836. Flexible conduit and conductor may be used so that power connection 836 may be maintained whatever the position of parabolic antenna 810. Data system 840 may receive and transmit data signals with parabolic antenna 810 via data connection 843. Like power connection 836, flexible conduit and conductor may be used so that data connection 843 may be maintained whatever the position of parabolic antenna 810.

Figure 10:
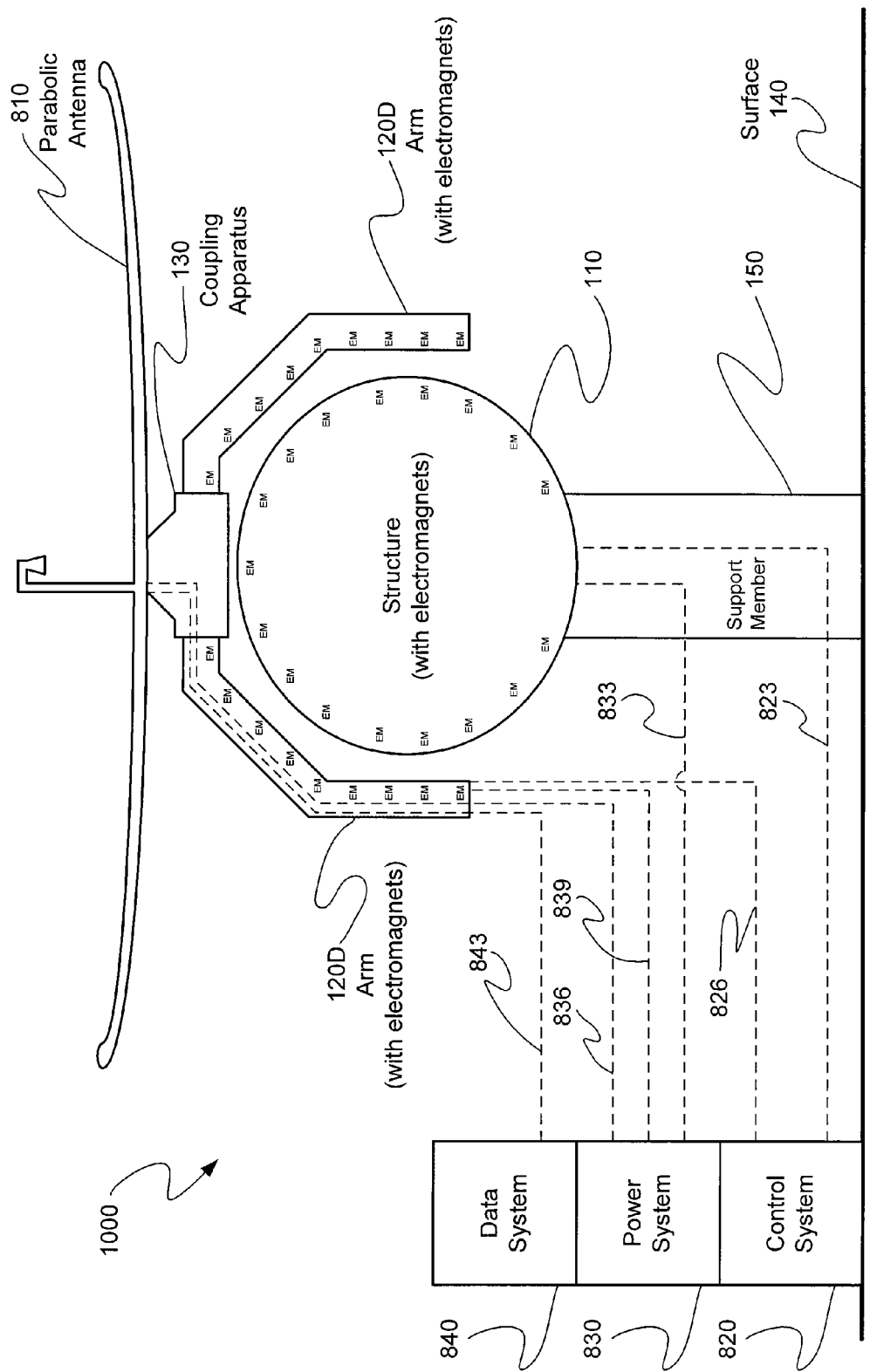
FIG. 10 is an electromechanical block diagram of an exemplary system for revolving a parabolic antenna using a spherical motor, similar to that in FIG. 8, except using electromagnets in both the structure and the arms.

In FIG. 10, an electro-mechanical block diagram of a third exemplary system 1000 for revolving a parabolic antenna 810 using a spherical motor is shown. In this embodiment, a control system 820 provides control signals via control connections 823, 826 to activate or deactivate electromagnets in both structure 110 and arms 120. The electromagnets in arms 120 will react to the magnetic field created by the electromagnets in structure 110, causing arms 120 to revolve around structure 110. Power for electromagnets in structure 110 is provided by power system 830 via power connection 833. Power for electromagnets in arms 120 is provided by power system 830 via power connection 839. Because parabolic antenna 810 is coupled with arms 120 via coupling apparatus 130, parabolic antenna will revolve around structure 110.

Power for parabolic antenna 810 is provided from power system 830 via power connection 836. Flexible conduit and conductor may be used so that power connection 836 may be maintained whatever the position of parabolic antenna 810. Data system 840 may receive and transmit data signals with parabolic antenna 810 via data connection 843. Like power connection 836, flexible conduit and conductor may be used so that data connection 843 may be maintained whatever the position of parabolic antenna 810.

Figure 11:
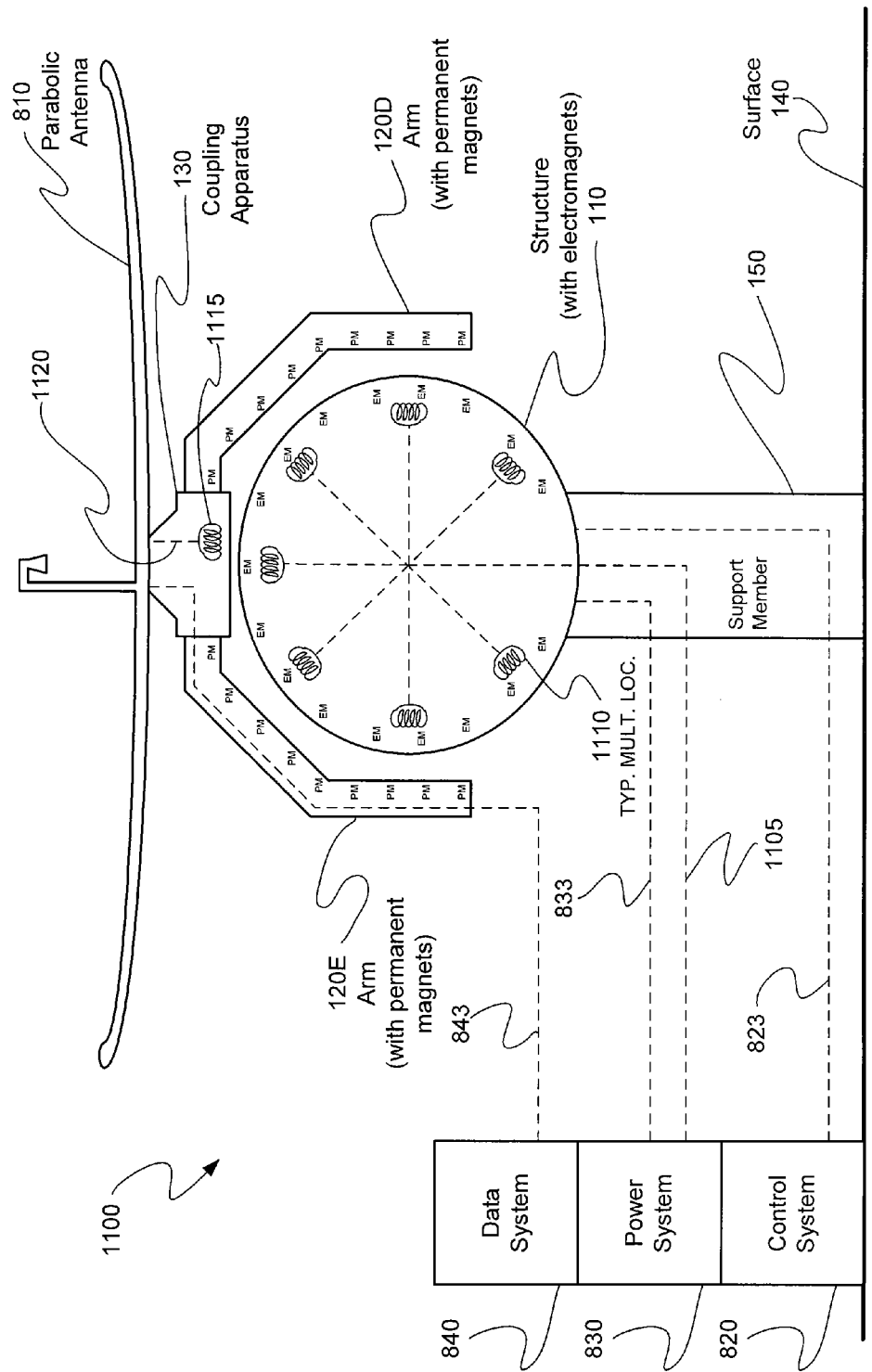
FIG. 11 is an electromechanical block diagram of an exemplary system for revolving a parabolic antenna using a spherical motor, similar to that in FIG. 8, except where power is transferred to the parabolic antenna using electromagnetic induction.

In FIG. 11, an electromechanical block diagram of a fourth exemplary system 1100 for revolving a parabolic antenna 810 using a spherical motor is shown. In this embodiment, a control system 820 provides control signals via control connection 823 to activate or deactivate electromagnets in structure 110. The permanent magnets in arms 120 will react to the electromagnetic field created by the electromagnets in structure 110, causing arms 120 to revolve around structure 110. Power for electromagnets in structure 110 is provided by power system 830 via power connection 833. Because parabolic antenna 810 is coupled with arms 120 via coupling apparatus 130, parabolic antenna will revolve around structure 110.

Power for parabolic antenna 810 is provided from power system 830 via power connection 1105, primary electromagnetic induction coils 1110, secondary electromagnetic induction coils 1115, and power connection 1120. Though seven primary electromagnetic induction coils 1110, and one secondary electromagnetic induction coil 1115 are shown in FIG. 11 so as not to complicate the figure, any number of primary electromagnetic induction coils 1110 and/or secondary electromagnetic induction coils may be present in various embodiments of the invention.

Primary electromagnetic coils 1110 may create an electromagnetic field from power delivered via power connection 1105, and secondary electromagnetic coil 1115 may react to the electromagnetic field and produce power which may be provided to parabolic antenna 810 via power connection 1120. In this manner, power can be transferred to arms 120, coupling apparatus 130 and parabolic antenna 810 without a physical conductor connection with other components of the system. In some embodiments, electromagnets in structure 110 may also provide the functionality of primary electromagnet coils 1110 in addition to their functionality in rotating arms 120.

Data system 840 may receive and transmit data signals with parabolic antenna 810 via data connection 843. Flexible conduit and conductor may be used so that data connection 843 may be maintained whatever the position of parabolic antenna 810.

Figure 12:
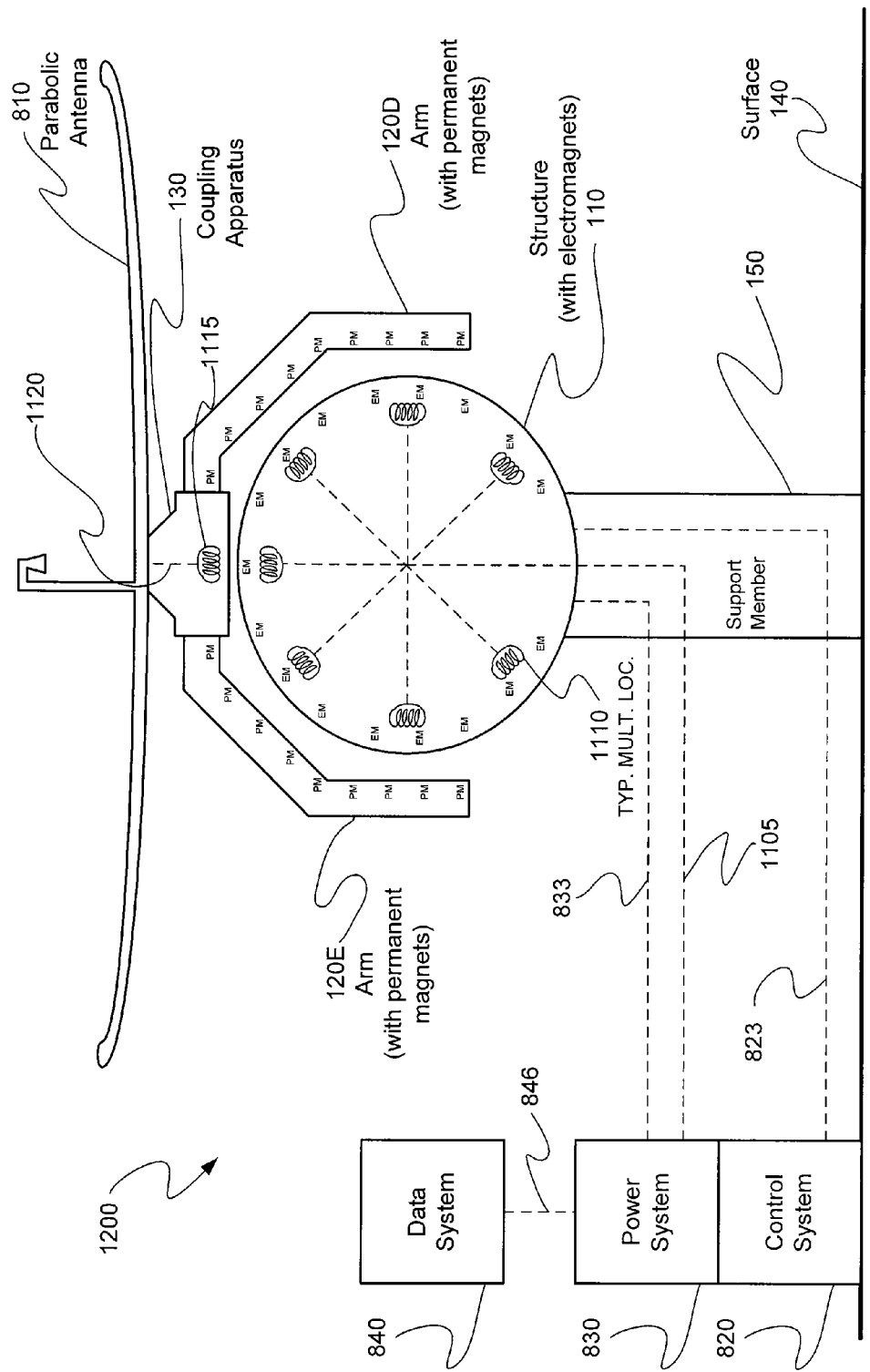
FIG. 12 is an electromechanical block diagram of an exemplary system for revolving a parabolic antenna using a spherical motor, similar to that in FIG. 11, except where data is transferred to the parabolic antenna via modulation within the power supplied to the parabolic antenna.

In FIG. 12, an electromechanical block diagram of a fifth exemplary system 1200 for revolving a parabolic antenna 810 using a spherical motor is shown. In this embodiment, a control system 820 provides control signals via control connection 823 to activate or deactivate electromagnets in structure 110. The permanent magnets in arms 120 will react to the electromagnetic field created by the electromagnets in structure 110, causing arms 120 to revolve around structure 110. Power for electromagnets in structure 110 is provided by power system 830 via power connection 833. Because parabolic antenna 810 is coupled with arms 120 via coupling apparatus 130, parabolic antenna will revolve around structure 110.

Power for parabolic antenna 810 is provided from power system 830 via power connection 1105, primary electromagnetic induction coils 1110, secondary electromagnetic induction coils 1115, and power connection 1120. Though seven primary electromagnetic induction coils 1110, and one secondary electromagnetic induction coil 1115 are shown in FIG. 12 so as not to complicate the figure, any number of primary electromagnetic induction coils 1110 and/or secondary electromagnetic induction coils may be present in various embodiments of the invention. Primary electromagnetic coils 1110 may create an electromagnetic field from power delivered via power connection 1105, and secondary electromagnetic coil 1115 may react to the electromagnetic field and produce power which may be provided to parabolic antenna 810 via power connection 1120. In this manner, power can be transferred to arms 120, coupling apparatus 130 and parabolic antenna 810 without a physical conductor connection with other components of the system. In some embodiments, electromagnets in structure 110 may also or alternatively provide the functionality of primary electromagnet coils 1110 in addition to their functionality for rotating arms 120.

In fifth exemplary system 1200, data signals transmitted to and from data system 840 and parabolic antenna 810 may be modulated within the power transmitted via power connection 1105, primary electromagnetic induction coils 1110, secondary electromagnetic induction coils 1115, and power connection 1120. Data system 840 may receive and transmit data signals with power system 830 via data connection 846 so that the data signals may be modulated to parabolic antenna 810 via the delivery of power. In this manner, data signals can be exchanged between data system 840 and parabolic antenna without a physical conductor connection between the two.

Figure 13:
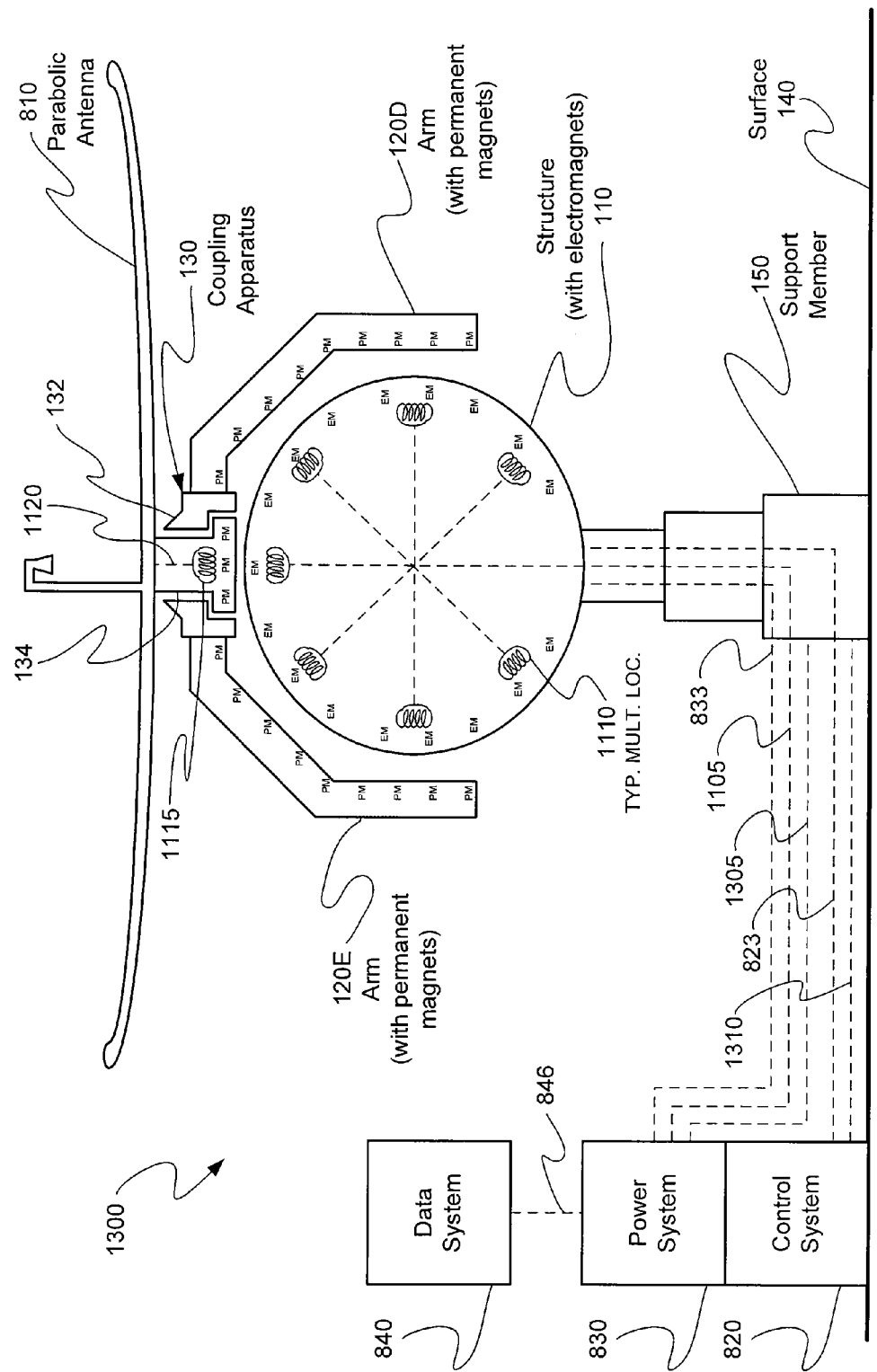
FIG. 13 is an electromechanical block diagram of an exemplary system for revolving a parabolic antenna using a spherical motor, similar to that in FIG. 12, except having a rotatable coupling apparatus to change the polarity of the parabolic antenna.

In FIG. 13, electromechanical block diagram of a sixth exemplary system 1300 for revolving a parabolic antenna 810 using a spherical motor is shown. This embodiment is similar to that shown in FIG. 12, except that (1) a rotatable coupling apparatus 130, and (2) a telescoping support member 150, are shown. Telescoping support member 150 is powered via power connection 1305 and controlled by control system 820 via control connection 1310.

Rotatable coupling apparatus 130 includes an outer sleeve 132 and an inner shaft 134. When a subject object, in this case parabolic antenna 810, is coupled with inner shaft 134, it may be turned relative to outer sleeve 132 which may be fixedly coupled with arms 120. In this manner, the polarity of parabolic antenna 810 may be changed by rotating inner shaft 134 rather than arms 120. While in some embodiments inner shaft 134 may be rotated by a motor and/or gearbox coupled with inner shaft 134 and/or outer sleeve 132, however in the embodiment shown electromagnets are used to rotate inner sleeve 134. As described elsewhere, arms 120 may instead be, or may also be, rotated to adjust the polarity of the subject object.

Figure 14:
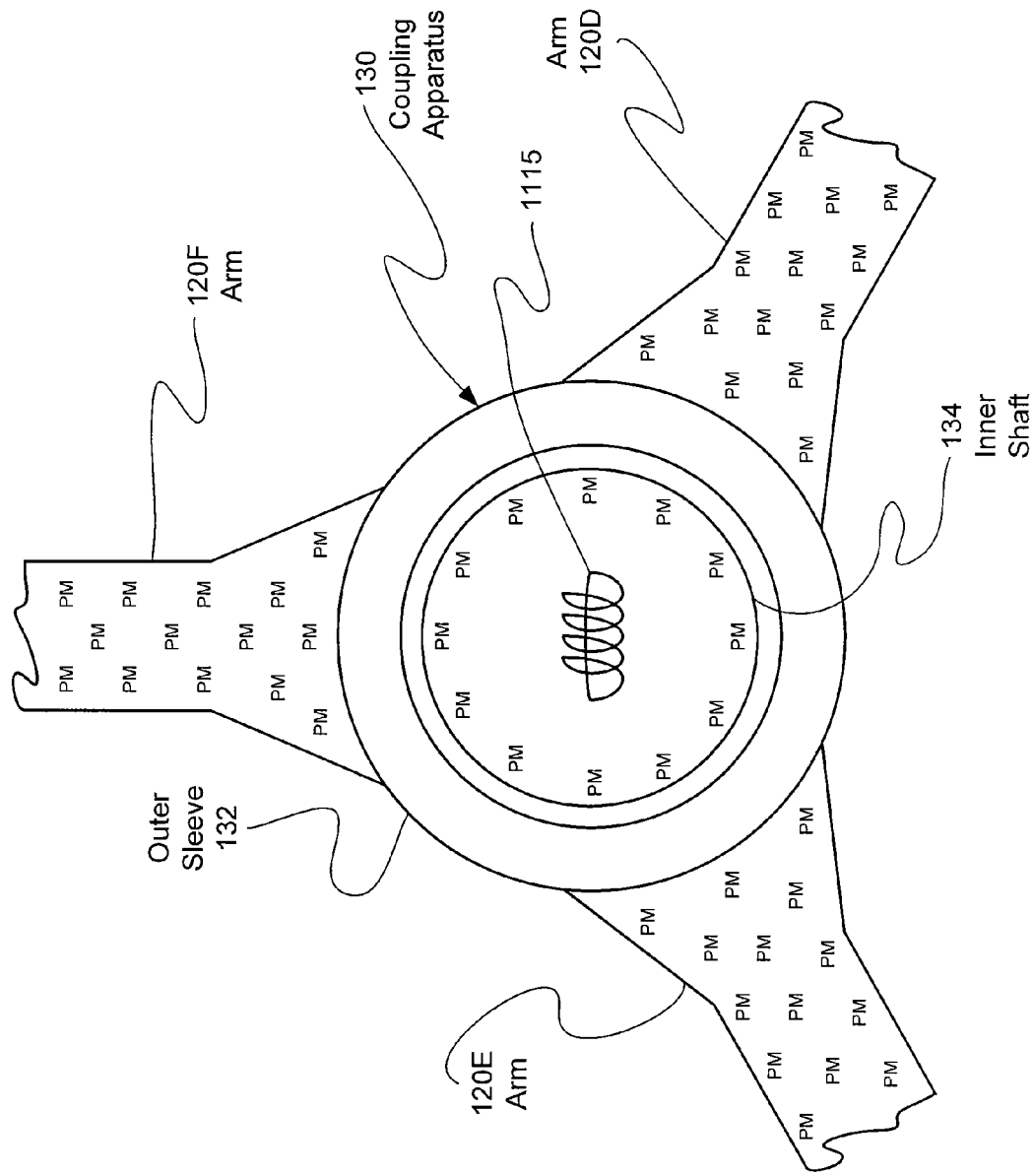
FIG. 14 is a plan view of the underside of the rotatable coupling apparatus from FIG. 13.

Turning to FIG. 14, a plan view of the underside of coupling apparatus 130 from FIG. 13 is shown. The underside is the side of coupling apparatus 130 which faces structure 110. A portion of arms 120, with their permanent magnets are also shown in FIG. 14. When it is desired to rotate inner shaft 134, electromagnets in structure 110 within proximity to the permanent magnets are activated in a circular manner so as to cause the permanent magnets in inner shaft 134 to react and rotate inner shaft 134. In other embodiments, arms may have electromagnets which may be activated to cause rotation of inner shaft 134.

Figure 15:
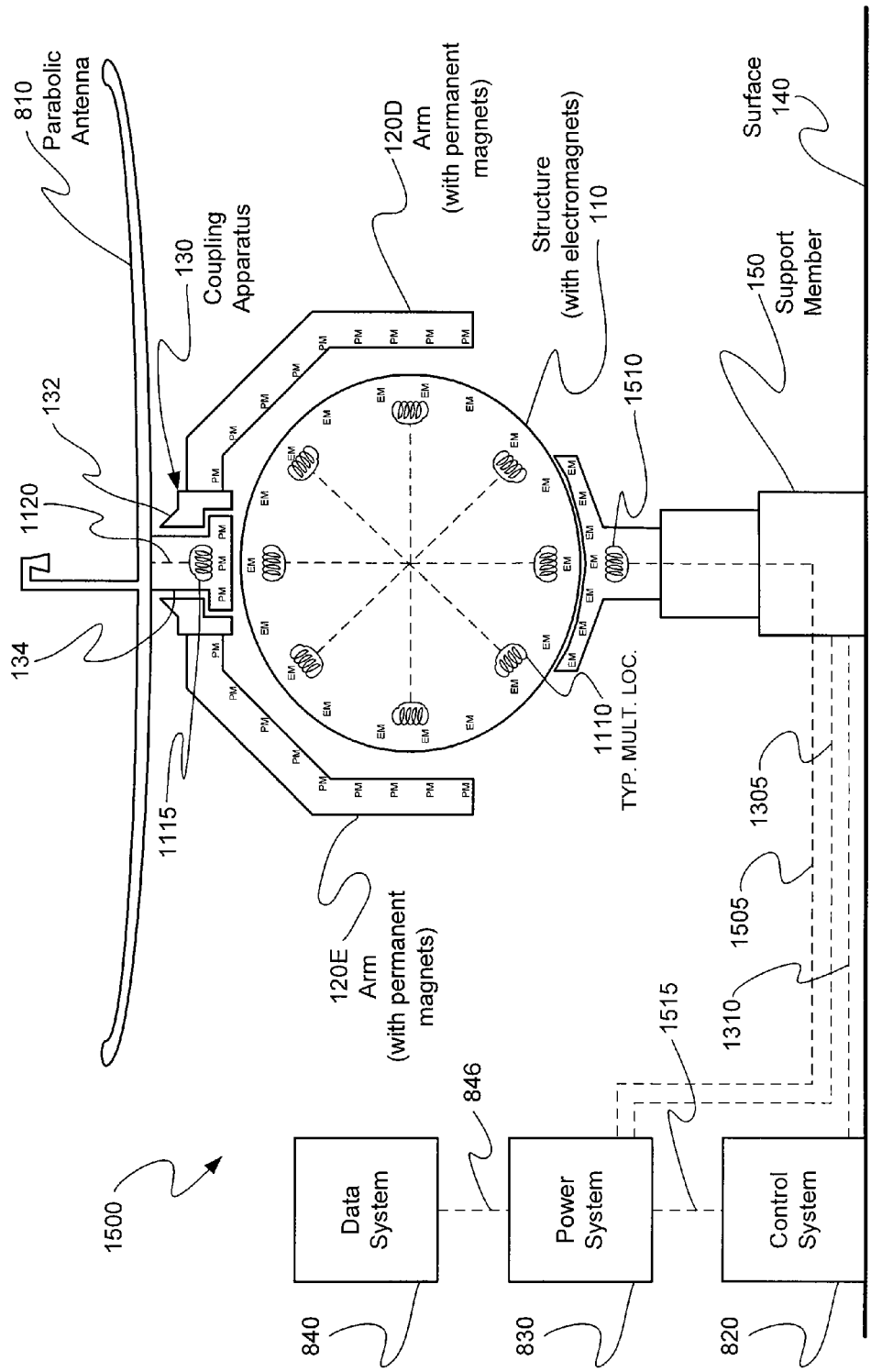
FIG. 15 is an electromechanical block diagram of an exemplary system for revolving a parabolic antenna using a spherical motor, similar to that in FIG. 13, except having the ability to rotate the structure with respect to the support member, where the structure is controlled via modulated control signals and power is provided to the structure via electromagnetic induction.

In FIG. 15, electromechanical block diagram of a seventh exemplary system 1500 for revolving a parabolic antenna 810 using a spherical motor is shown. This embodiment is similar to that shown in FIG. 13, except in this embodiment, structure 110 may be rotated with respect to support member 150. Because both arms 120 and structure 110 may rotate, more torque and/or speed may be brought to bear when moving subject object (in this case parabolic antenna 810). Bearing systems, such as those discussed above in regards to friction between arms 120 and structure 110, may also be used to reduce friction between support member 150 and structure 110. Power for electromagnets in support member 150 may be delivered from power system 830 via power connection 1305, and control signals may be transmitted via control connection 1310.

In system 1500, power is supplied to structure 110 via electromagnetic induction using power connection 1505 and super-primary electromagnetic induction coil 1510. Power may then also be transmitted from structure 110 to parabolic antenna 810 using primary electromagnetic induction coils 1110 and secondary electromagnetic coil 1115. Control signals for the electromagnets in structure 110 may be supplied from control system 820 via modulating the signals into power delivered to structure 110. Control system 820 may receive and transmit control signals with power system 830 via control connection 1515 so that the control signals may be modulated to structure 110 via the delivery of power. Data signals from data system 840 to parabolic antenna 810 may also be modulated in the same manner as before with the extra step of modulating the signals through structure 110.

The invention has now been described in detail for the purposes of clarity and understanding. However, it will be appreciated that certain changes and modifications may be practiced within the scope of the appended claims.

What is claimed is:

1. A system for aiming an antenna in a direction below-horizon, wherein the system comprises:
   a support member, wherein the support member is coupled with a surface;
   a spherical structure, wherein:
      the spherical structure is coupled with the support member; and
      the spherical structure is at least partially spherical in shape about a central point; and
   at least one arm, wherein:
      the at least one arm is rotatably coupled with the spherical structure;
      the at least one arm is coupled with the antenna;
      the at least one arm at least partially defines a void; and
      the support member is at least partially disposed within the void when the antenna is aimed in the direction below-horizon.

2. The system for aiming an antenna in a direction below-horizon of claim 1, wherein:
   the spherical structure comprises a first plurality of magnets;
   the at least one arm comprises a second plurality of magnets; and
   at least a portion of the magnets in either one of, or both of, the first plurality of magnets and the second plurality of magnets are configured to be selectively activated to rotate the at least one arm about the central point.

3. The system for aiming an antenna in a direction below-horizon of claim 1, wherein either one of, or both of, the first plurality of magnets and the second plurality of magnets comprise electromagnets.

4. The system for aiming an antenna in a direction below-horizon of claim 1, wherein either one of, or both of, the first plurality of magnets and the second plurality of magnets comprise permanent magnets.

5. The system for aiming an antenna in a direction below-horizon of claim 1, wherein:
   the at least one arm comprises three arms comprising a first arm, a second arm, and a third arm; and
   the void is defined between the first arm and the second arm.

6. The system for aiming an antenna in a direction below-horizon of claim 1, wherein the at least one arm comprises a plurality of arms, and at least one of the plurality of arms comprises a counterweight.

7. The system for aiming an antenna in a direction below-horizon of claim 6, wherein the at least on of the plurality of arms comprising a counterweight comprises an arm pointed in a direction substantially opposite the direction below-horizon.

8. The system for aiming an antenna in a direction below-horizon of claim 1, wherein:
   the at least one arm comprises a single arm, wherein the arm is characterized by an at least partially spherical shape.

9. The system for aiming an antenna in a direction below-horizon of claim 1, wherein support member is configured to selectively change a distance between the surface and the spherical structure.

10. The system for aiming an antenna in a direction below-horizon of claim 1, wherein support member is configured to selectively change a rotational orientation of the spherical motor relative to the surface.

11. The system for aiming an antenna in a direction below-horizon of claim 1, wherein the spherical structure further comprises a first plurality of magnets, and wherein system further comprises:
   a coupling apparatus, wherein:
      the coupling apparatus is fixedly coupled with the antenna;
      the coupling apparatus is rotatably coupled with the at least one arm; and
      the coupling apparatus comprises a second plurality of magnets, wherein at least a portion of the magnets in either one of, or both of, the first plurality of magnets and the second plurality of magnets are configured to be selectively activated to rotate the coupling apparatus relative to the at least one arm.

12. A method for aiming an antenna in a direction below-horizon, wherein the method comprises:
   providing a support member, wherein the support member is coupled with a surface;
   providing a spherical structure, wherein:
      the spherical structure is coupled with the support member; and
      the spherical structure is at least partially spherical in shape about a central point;
   providing at least one arm, wherein:
      the at least one arm is rotatably coupled with the spherical structure;
      the at least one arm is coupled with the antenna; and
      the at least one arm at least partially defines a void; and
   rotating the at least one arm such that the support member is at least partially disposed within the void when the antenna is aimed in the direction below-horizon.

13. The method for aiming an antenna in a direction below-horizon of claim 12, wherein:
   the spherical structure comprises a first plurality of magnets;
   the at least one arm comprises a second plurality of magnets; and
   rotating the at least one arm comprises activating, selectively, at least a portion of the magnets in either one of, or both of, the first plurality of magnets and the second plurality of magnets to rotate the at least one arm about the central point.

14. The method for aiming an antenna in a direction below-horizon of claim 12, wherein the spherical structure comprises a primary plurality of magnets and the at least one arm comprises a secondary plurality of magnets, and wherein the method further comprises:
   activating, selectively, at least a portion of the magnets in either one of, or both of, the primary plurality of magnets and the secondary plurality of magnets to create a gap between at least some portion of the at least one arm and the spherical structure.

15. The method for aiming an antenna in a direction below-horizon of claim 12, wherein the method further comprises:
   providing a layer of fluid between at least a portion of the at least one arm, wherein the layer of fluid reduces friction between the at least one arm and the spherical structure.

16. The method for aiming an antenna in a direction below-horizon of claim 12, wherein the method further comprises:
   transmitting or receiving data, wirelessly, with the parabolic antenna at a location proximately located to the antenna.

* * * * *